Feb. 28, 1928.

C. H. TOMLINSON 1,660,733

CAR COUPLER

Filed June 10, 1926

Inventor
CHARLES H. TOMLINSON

Witness
H. J. Stromberger

By Nissen & Crane
Attorneys

Feb. 28, 1928.

C. H. TOMLINSON 1,660,733

CAR COUPLER

Filed June 10, 1926

Witness:
H. J. Stromberger

Inventor
CHARLES H. TOMLINSON
By Vissen & Crane
Attorneys

Feb. 28, 1928.

C. H. TOMLINSON 1,660,733

CAR COUPLER

Filed June 10, 1926

Inventor

CHARLES H. TOMLINSON

Witness:

H. J. Stromberger

By Nissen & Crane

Attorney

Feb. 28, 1928.

C. H. TOMLINSON 1,660,733

CAR COUPLER

Filed June 10, 1926 9 Sheets-Sheet 5

Inventor
CHARLES H. TOMLINSON
By Nissen & Crane
Attorney

Witness:
H. J. Stromberger

Feb. 28, 1928.

C. H. TOMLINSON 1,660,733

CAR COUPLER

Filed June 10, 1926

Witness
H. J. Stromberger

Inventor
CHARLES H. TOMLINSON
By Nissen & Crane
Attorney

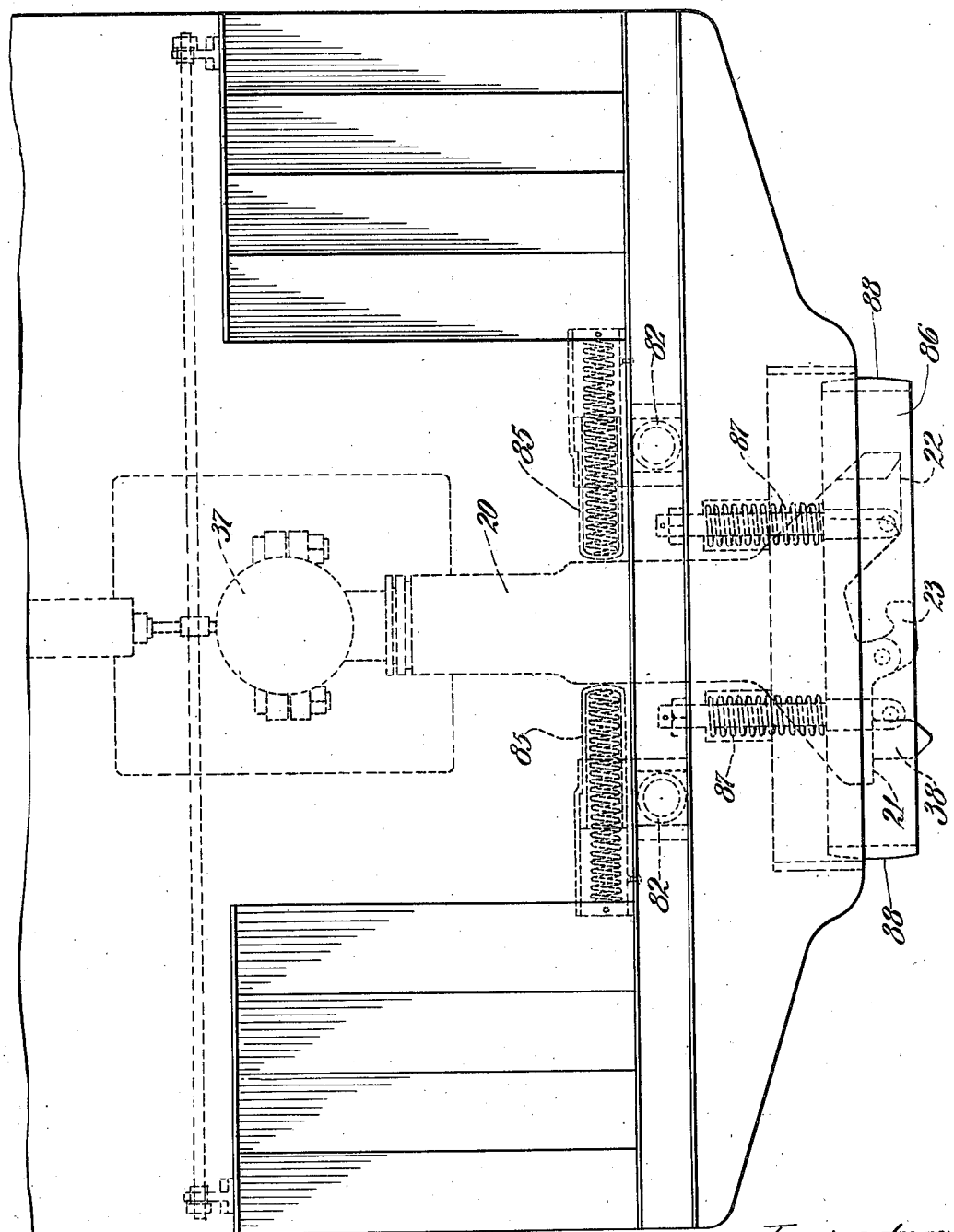

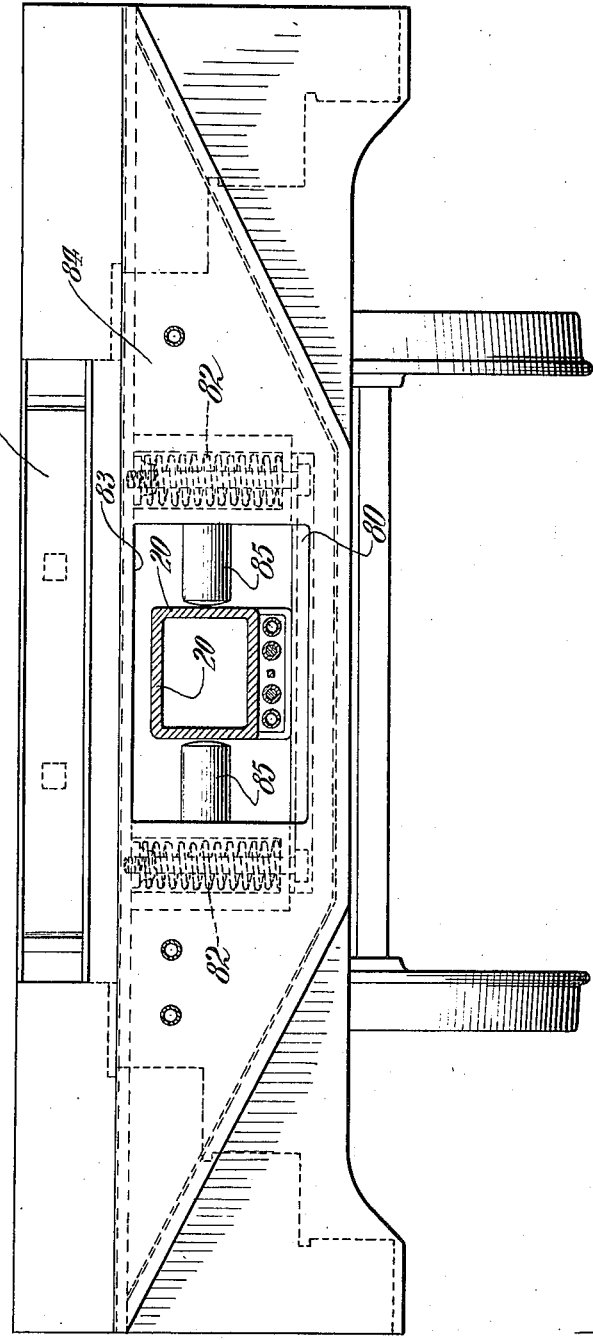

Patented Feb. 28, 1928.

1,660,733

UNITED STATES PATENT OFFICE.

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

CAR COUPLER.

Application filed June 10, 1926. Serial No. 114,904.

This invention relates to couplers of the Janney type, and has for one of its objects the provision of tight locking couplers having no vertical, lateral or longitudinal movement of one head relative to the other when in coupled relation.

A further object is to provide guiding means for couplers of the Janney type which will bring the vertical and horizontal center lines of the couplers into registration when the coupling heads approach each other.

Other objects and advantages of the invention will appear from the following description.

The invention is exemplified in the combination and arrangement of parts shown in the accompanying drawings and described in the following specification, and it is more particularly pointed out in the appended claims.

In the drawings—

Fig. 20 is a top plan view of a car platform showing the manner of attaching the draw-bar and coupler comprising the invention thereto; and Fig. 21 is an end elevation of the car platform with the coupler draw-bar in section.

Figure 6:
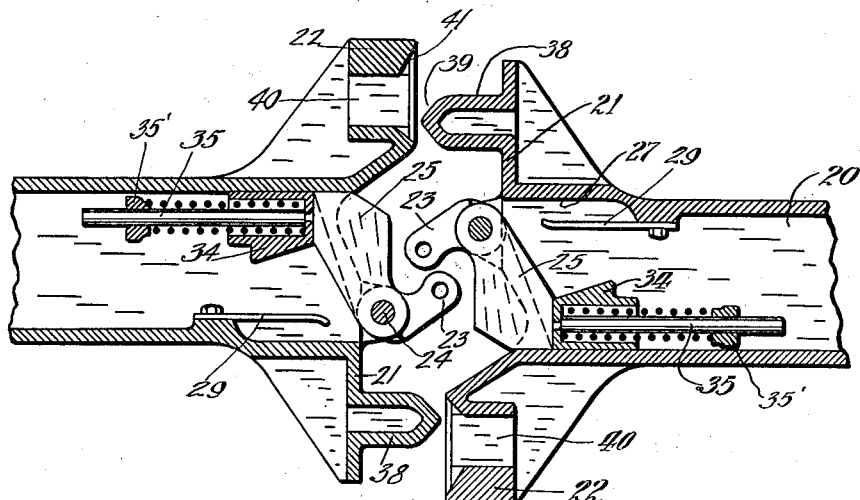
Fig. 6 is a view similar to Fig. 5, but showing the heads at their opposite extreme position of lateral displacement from that shown in Fig. 5.

Referring first to the form of the invention shown in Figs. 1 to 8, inclusive, the numeral 20 designates a draw-bar which may be of hollow tubular construction, as illustrated in the drawings, having laterally projecting abutments 21 and 22 at opposite sides of the front end of the draw-bar forming the abutting surfaces for the coupler heads. Within each coupling head a locking knuckle 23 is pivotally mounted on a vertical pin 24 and is provided with a locking tail-piece 25. The tail-piece 25 is provided with a contact face 26 arranged to engage the side wall 27 of the coupler head when the knuckle 23 is moved to its extreme locking position. The face 26 of the tail-piece 25 is provided with a groove 28 for receiving a spring 29 which tends to move the face 26 away from the side wall 27 and swing the knuckle toward its open position. The tail-piece 25 is provided with a contact face 30 arranged to engage the wall 31 of the coupler head at the side opposite the wall 27 when the knuckle is in open position, as shown in Fig. 6. The tail-piece is also provided with a contact face 32 for engaging the inclined face 33 of a sliding wedge lock 34. The lock 34 is guided by a rod 35 slidably mounted in a cross-bar 35' and by guide strips 35'' secured to the walls of the member 20. The lock is pressed toward the contact face of the coupler head by a spring 36 surrounding the rod 35. Any suitable means, such as that shown in my prior Patent No. 1,495,463, may be attached to the rod for withdrawing the lock when desired.

Figure 3:
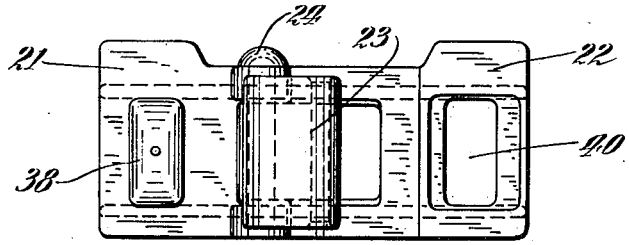
Fig. 3 is a face view of one of the coupler heads shown in Figs. 1 and 2.
Figure 4:
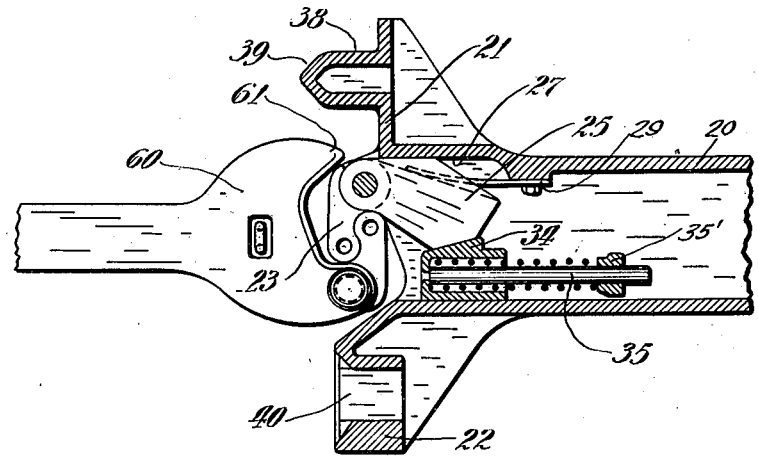
Fig. 4 is a plan view showing a coupler head made according to the present invention coupled up with a standard Janney coupler, the head embodying the present invention being shown in horizontal section.
Figure 5:
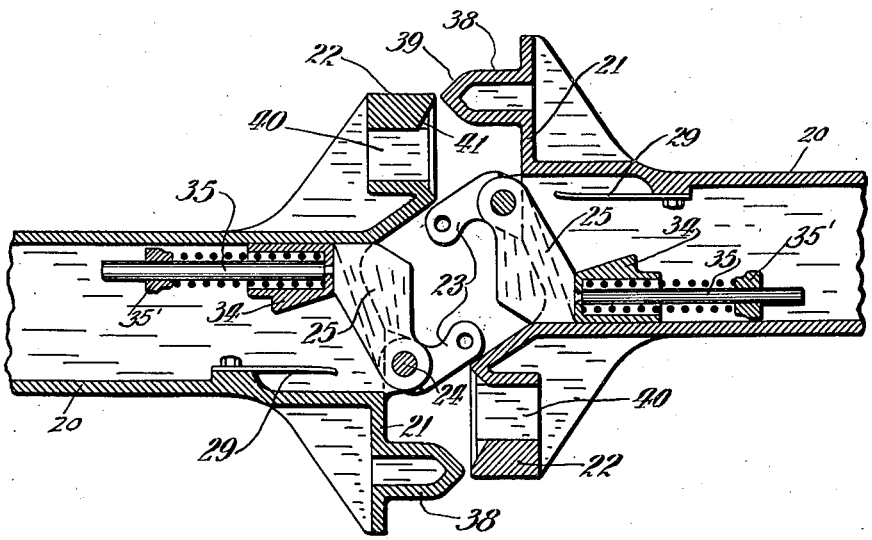
Fig. 5 is a horizontal sectional view of a pair of complementary coupling heads embodying the present invention, the heads being shown prior to the coupling engagement and at their extreme position of lateral displacement relative to each other.

The draw-bar is attached to the car body by a ball and socket connection 37 and is yieldingly held in central position both vertically and laterally in a manner well known in the art. The abutments 21 are provided with alinement pins 38 having pointed ends 39 for guiding the pins into openings 40 in the abutments 22. The entrance ends of the openings 40 are beveled as shown at 41 to co-operate with the beveled ends of the pins 38 to guide the coupler heads into alinement upon impact of the cars. The pins 34 and openings 40 are provided with ample straight contact surfaces to hold the coupler heads against vertical and lateral movement and in true alinement when the pins are inserted in their sockets. As shown in Fig. 3, the pins 38 and openings 40 are rectangular in shape having their longest axes vertical. It is apparent that the pins and complementary recesses could be oblong in cross-section having rounded corners and taper to rounded points and accomplish the same results. The beveled faces of the pins 38 in co-operation with the beveled ends of the openings 40 are sufficient to guide the coupler heads into alining relation from their extreme positions of displacement both vertically and laterally. When the heads are coupled together they form a rigid bar uniting the ball and socket connections 37 and there is no pivotal motion upon the the coupler knuckles, as is the case in the standard Janney type coupler. However, as shown in Fig. 4, the improved coupler may be connected with the ordinary Janney type and will permit lateral pivoting when so connected and also vertical sliding movement. This relative movement at the coupled connection is necessary for the standard Janney coupler since the draw-bars of the ordinary coupling construction are not provided with the ball and socket connections such as are shown at 37. Where these connections are provided the couplers may be rigidly connected since the ball and socket connections with the cars permit the necessary vertical and lateral displacement of the cars relative to each other without relative movement of the coupler heads themselves.

Heretofore in couplers of the Janney type there has always been a certain amount of lost motion or play in a longitudinal direction. This produces constant wear on the coupler and gives rise to many difficulties in the operation of trains due to the fact that there is always lost motion between cars of trains coupled in this way. The present invention provides means for preventing longitudinal movement of the coupler heads so that the train becomes in effect a solid unit so far as longitudinal movement is concerned and may be operated without repeated successions of impact which takes place under present conditions each time the direction of the force exerted on the train is reversed, as in starting and stopping. Another great advantage of close connection of the couplers is that it makes it possible to connect train line couplers rigidly to the mechanical couplers and hold the contact points in abutting relation. Many advantages of a tight coupling connection will readily suggest themselves to those familiar with operating conditions. The close contact of the coupler faces forming the tight connection is secured by the wedging locking mechanism previously referred to. It will be seen from Fig. 1 that when the contact faces of the holding knuckles 23 are in engagement with each other the stop faces 26 are slightly spaced from the side walls 27 of the coupler heads. The wedging surface 33 of the lock 34 co-operates with the face 32 of the tail-piece 25 to force the tail-piece outwardly toward the side wall 27 and thus draw the contact face of the knuckle 23 closely into engagement with its companion knuckle. This exerts a lever action on the knuckles about their pivotal pins 24 which draws the contact faces of the coupler heads into close engagement. The springs 36 are continually urging the wedging locks 34 forwardly so that if the engagement at any time tends to loosen in any way, the wedge immediately moves forwardly and takes up this lost motion. It is thus seen that the contact faces of the coupler heads are constantly drawn together by a powerful wedging action so that all tendency toward longitudinal movement of the coupler heads is prevented. Of course the draw-bars may be provided with the usual draw-bar springs to give the necessary resiliency to the draw-bar connection, but all lost motion or play in the coupled head is entirely removed and the draw-bar connection so far as the coupler head is concerned becomes a single rigid bar when the two heads are coupled together.

Figure 7:
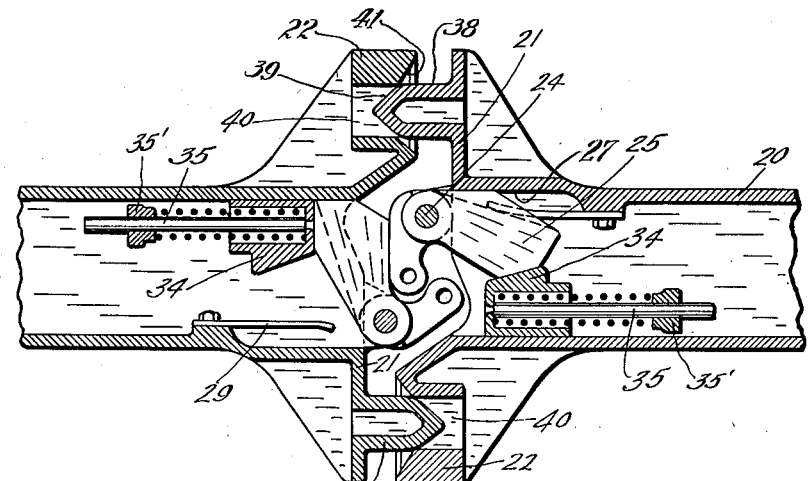
Fig. 7 is a view similar to Figs. 5 and 6, but showing the heads closer together and guided into alinement, the figure showing the operation of the locking knuckles when one of the knuckles is in locked position at the time of impact.

When it is desired to uncouple the cars, this may be done by withdrawing either one or both of the locking wedges 34. As soon as the locking wedges are withdrawn the spring 29 will throw the tail-piece 25 inwardly in front of the locking wedge so that when the wedge is released it will engage the surface 42 of the tail-piece, as shown in Fig. 6, and hold the knuckles in unlocked position. If only one of the locking wedges is released the coupling heads will separate sufficiently to relieve the pins 38 from their co-operating recesses 40 to permit sufficient lateral displacement of the coupler heads to allow uncoupling; although the other knuckle remains locked in position. By reverse movement the cars may be coupled even though one of the coupler heads is locked in coupled position, as shown in Fig. 7. In a coupling operation the impact of the cars will rotate the knuckles into locking engagement with each other in the usual manner of Janney couplers and the wedging locks will yield to permit the tail-pieces to swing to their locking position, whereupon the locks will again be moved forwardly by their springs 36 to lock the knuckles in this position. If one of the knuckles is already in locked position prior to impact, its stop face 26 will be in close contact with the wall 27 of the coupler head, as shown in Fig. 7. When this is the case the stop face of the opposite knuckle will be held farther from its corresponding wall 27 so that only one of the locking wedges can operate to take up any lost motion between the contact faces of the coupler heads. However, this one knuckle will have a large range of movement so that the single locking wedge can serve to insure tight contact between the faces of the coupler heads.

Figure 9:
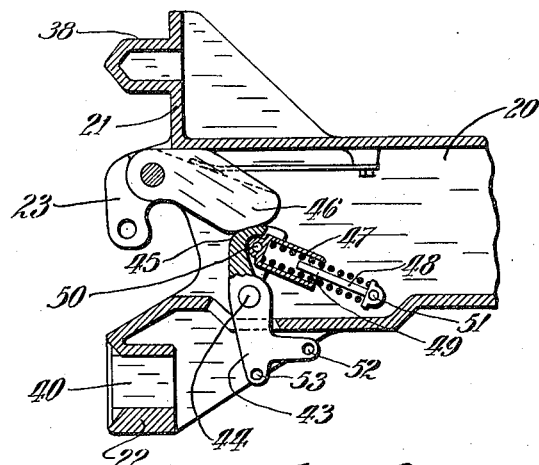
Fig. 9 is a horizontal sectional view of a car coupler showing a modification of the locking mechanism.

In the form of the invention shown in Fig. 9, the wedging lock 34 is replaced by a cam lever 43 pivotally mounted at 44 and having a cam surface 45 which engages the tail-piece 46 of the knuckle 23 and wedges the tail-piece outwardly giving the same effect as the sliding wedge 34 in the form previously described. An expansion link made up of telescoping members 47 and 48 and an expansion spring 49 is pivoted to the lever 43 at 50 and to the coupler head at 51. This link forces the cam face 45 against the tail-piece 46 constantly urging the tail-piece 46 outwardly. The lever 43 is provided with openings 52 and 53 to which any suitable means may be connected for unlocking the cam lever. For instance, a chain may be attached to the opening 52 and extended outwardly to the side of the car or an air piston may be attached to the opening 53 to control the cam lever.

Figure 10:
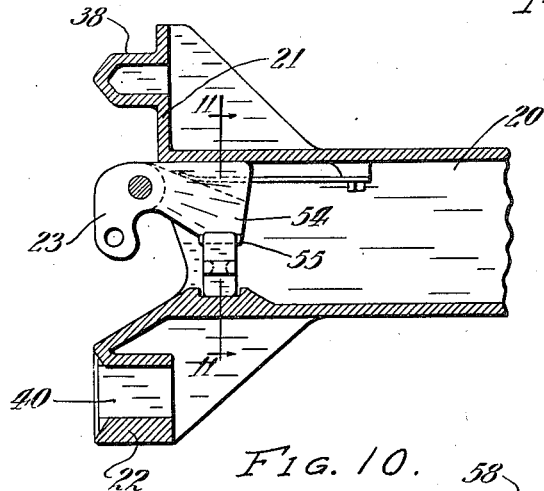
Fig. 10 is a view similar to Fig. 9 showing a different modification.
Figure 11:
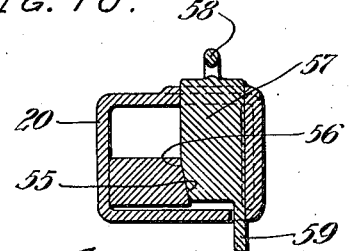
Fig. 11 is a vertical sectional view on line 11—11 of Fig. 10.

In the form of the invention shown in Figs. 10 and 11, the knuckle 23 is provided with a tail-piece 54 having a beveled face 55 which co-operates with a corresponding beveled face 56 on a vertically sliding gravity link 57. The link 57 is provided with an eye 58 to which a chain or other suitable operating means may be attached for lifting to lock to loosen the locking knuckle. A guide 59 may be provided at the lowed end of the lock. It will be seen that with this construction the link 57 is gravity-actuated and continually operates to swing the knuckle to its closed position.

Figure 1:
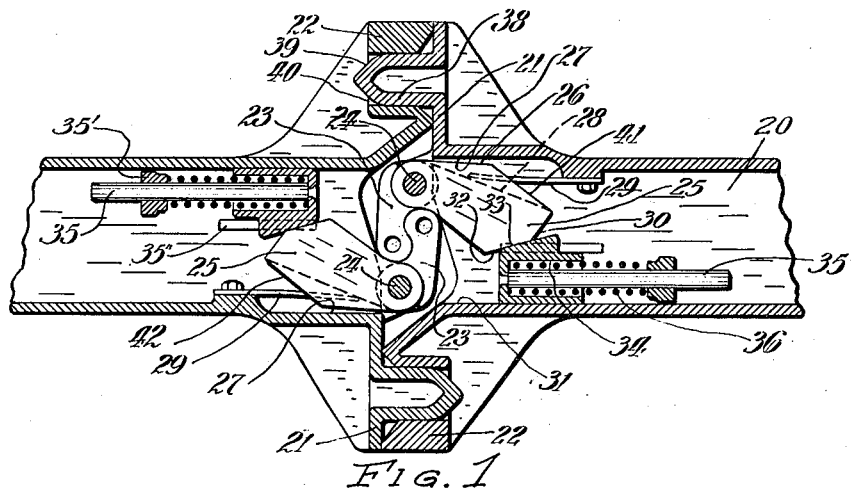
Fig. 1 is a horizontal sectional view through a pair of complementary coupling heads in coupled relation and showing one embodiment of the present invention.
Figure 2:
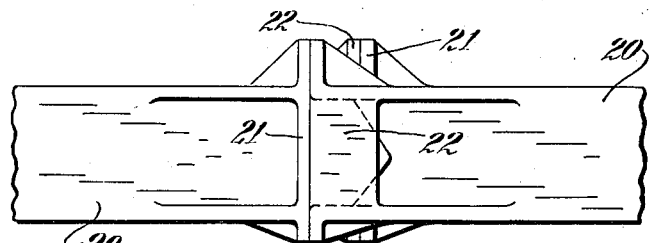
Fig. 2 is an elevation of the coupler heads shown in Fig. 1.

In Fig. 4 in which the improved form of coupler is shown in coupled relation with a Janney coupler 60 of standard practice, the tail-piece 35 is shown as abutting tightly against the side wall 27. This brings the upper portion of the knuckle in its proper transverse center line for co-operation with the bearing portion of the coupler 60. It is noted that the abutment face 21 is offset back of the transverse center line of the bearing knuckles and that the abutment 22 is offset ahead of the center line. This gives clearance space for the portion 61 of the coupler 60 when the coupler 60 swings about the pivotal connection formed by the coupling knuckles. The abutment 22 is advanced from the transverse center line of the knuckle an amount slightly greater than the displacement of the abutment 21 so that when the two couplers are brought together, as shown in Fig. 1, the abutment faces will engage each other before the knuckles are swung to their full closed position. This leaves a clearance between the faces 26 and 27, as shown in Fig. 1, to provide for sufficient draw to insure that the abutment faces will always be drawn tightly together, even after the couplers have been subjected to years of wear. In practice it has been found that each face may be offset one-eighth of an inch more from the center line of the knuckles than would be necessary to bring the faces together when the knuckles are completely closed. This provides for a total draw of one-fourth of an inch.

Figure 12:
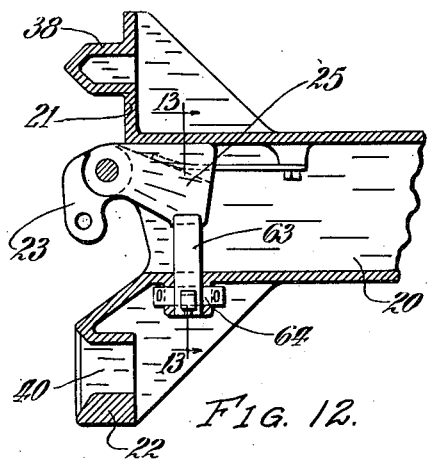
Fig. 12 is a horizontal sectional view through a coupler head showing a modified form of locking mechanism.
Figure 13:
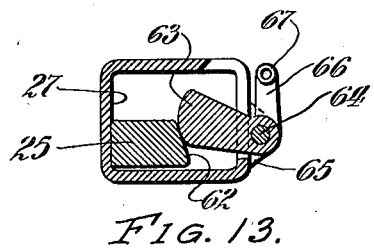
Fig. 13 is a section on line 13—13 of Fig. 12.

In the modifications shown in Figs. 12 and 13, the tail-piece 25 is provided with a beveled face 62 against which a cam lock 63 operates, the lock being pivoted on a pin 64 mounted in lugs 65 at the side of the coupler housing 20. The cam lock 63 is provided with an upwardly projecting lever arm 66 having an eye 67 for receiving an operating chain or rod by means of which the cam lock may be lifted out of engagement with the tail-piece 25. The cam member 63 is made sufficiently heavy that it will be operated by gravity to act continuously to wedge the tail-piece 25 toward the abutment wall 27 so as to take up any lost motion in the coupling.

Figure 14:
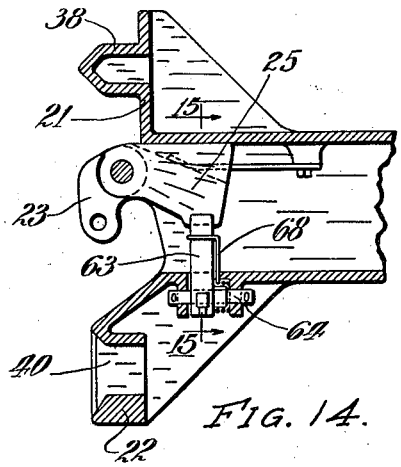
Fig. 14 is a view similar to Fig. 12 showing another modified form of the invention.
Figure 15:
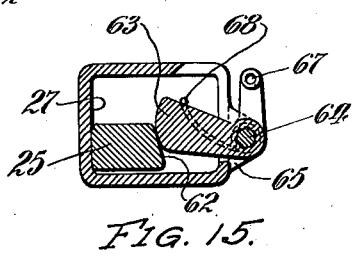
Fig. 15 is a section on line 15—15 of Fig. 14.

In the modifications shown in Figs. 14 and 15, the construction is similar to that shown in Figs. 12 and 13, except that the lock 63 is provided with a spring 68 surrounding the pin 64 and supplementing the action of gravity in closing the cam lock.

Figure 16:
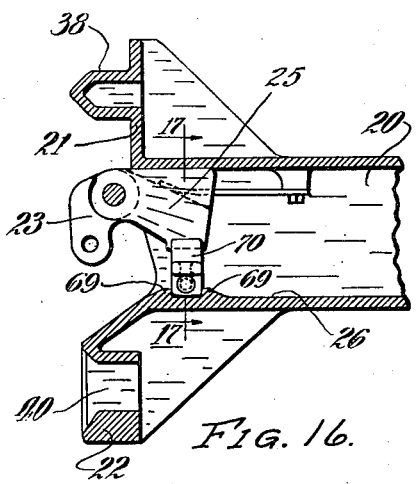
Fig. 16 is a view similar to Fig. 12 showing a different modification of locking mechanism.
Figure 17:
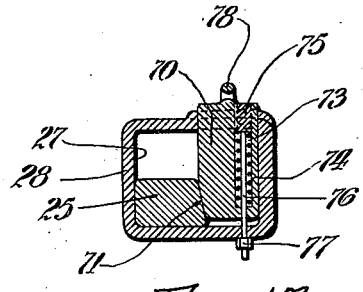
Fig. 17 is a section on line 17—17 of Fig. 16.

In the modifications shown in Figs. 16 and 17, the side wall 23 of the coupler member 20 is provided with a slideway formed by ribs 69. A slide block 70 moves vertically between the ribs 69 and is provided with a beveled face 71 which engages a beveled face on the tail-piece 25. The block 70 is provided with a vertically extending recess 73 having a spring 74 arranged therein which bears at its lower end at the bottom of the recess and at its upper end engages a head 75 on a bolt 76 which extends through the center of the recess. The lower end of the bolt 76 is extended through the bottom of the recess and through the bottom wall of the member 20 and is provided with a nut 77 or other fastening device. It will be seen that the spring 74 supplements the action of gravity in urging the lock 70 into wedging relation with the tail-piece 25. The lock 70 may be provided with an eye 78 for attachment to a lifting chain or other operating device.

Figure 8:
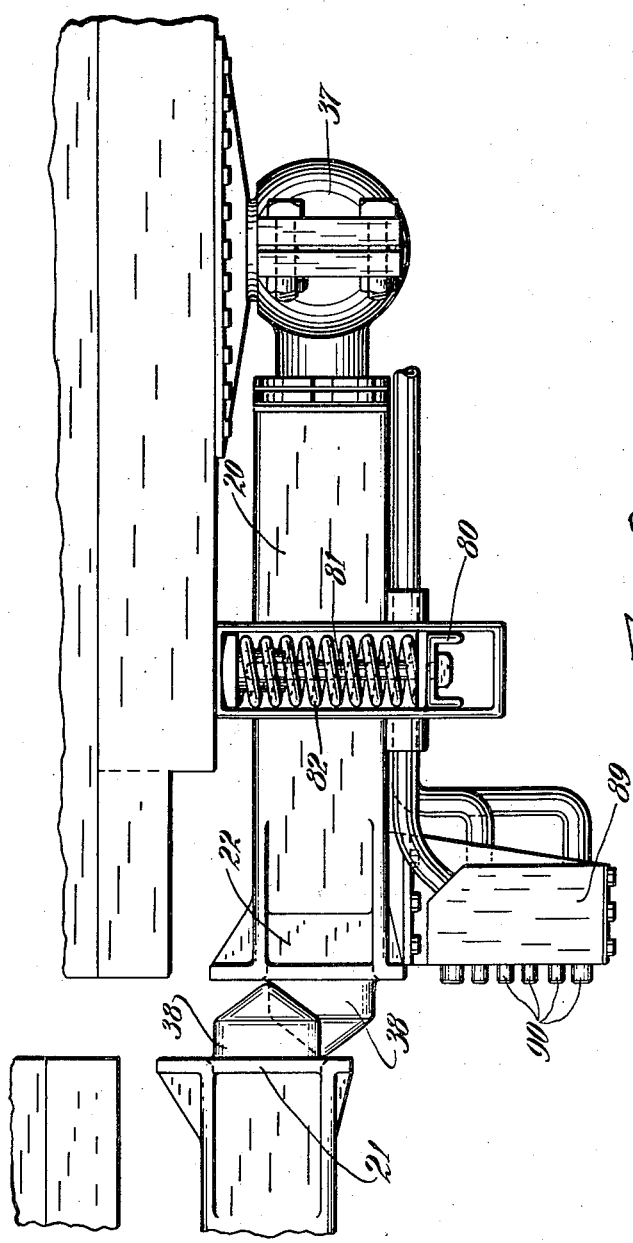
Fig. 8 is a side elevation showing a coupler head embodying the present invention attached to a car end and having a contact block supported thereby.
Figure 18:
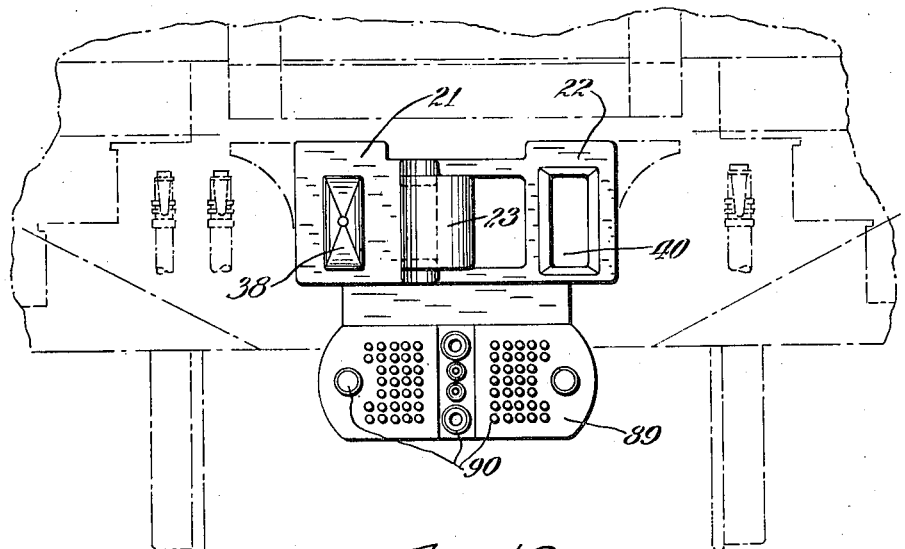
Fig. 18 is a face view of the coupler shown in Fig 8.
Figure 19:
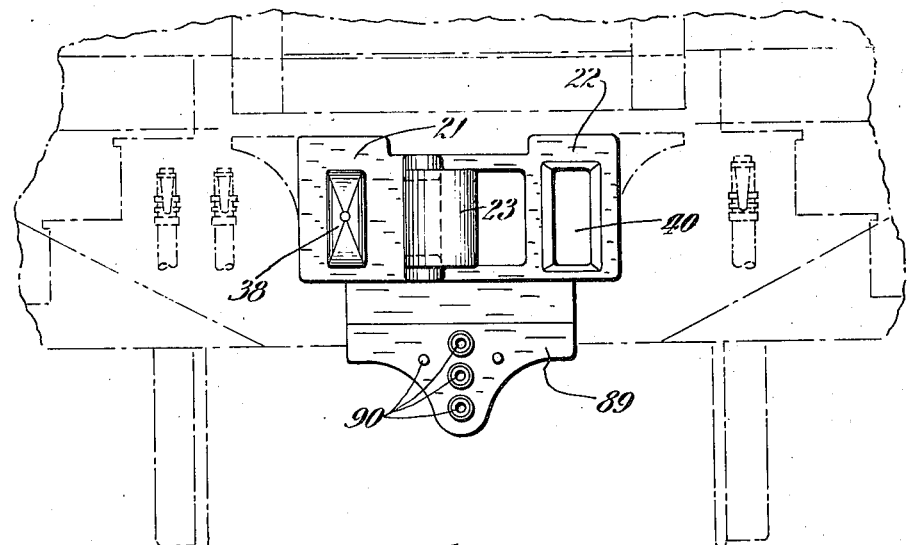
Fig. 19 is a face view of a coupler having a different form of train line circuit support mounted thereon.

As shown in Figs. 8, 18, 19 and 20, the draw-bar 20 is yieldingly held in its central position both as to lateral and vertical movement. The draw-bar is supported by a cross-bar 80 carried by pins 81 which are mounted on coil springs 82. The bar 80 permits a limited downward movement of the draw-bar 20 and the bar is free to move upwardly a limited amount as fixed by the upper wall 83 of an opening in the crown-piece 84 which forms the end of the car body and frame. The draw-bar 20 is resiliently held against lateral movement by spring plungers 85 which engage the opposite lateral faces of the draw-bar and are supported in the crown-piece 84. A buffer platform 86 extends beyond the crown-piece and is held in projected position by springs 87. The buffer platform 86 has its ends slightly rounded as shown at 88 so that either end of the buffer platform may yield inwardly when the cars are turned at an angle to each other in rounding a curve. Suitable contact supports shown at 89 in Figs. 8 and 18 are carried beneath the coupler heads and are rigidly secured thereto. Contact members project from the face of these supports and may include both electrical and fluid pipe connections. The contact members shown at 90 are preferably spring-held, but may be rigid since the couplers are brought into alinement prior to engagement of the contacts and are tightly held together by the mechanical coupling elements. In Fig. 18 there are shown power line electrical contacts, signal line electrical contacts and air line contacts. It will be understood that any combination of train line contacts may be used as found desirable. In Fig. 19, for instance, there are shown air signal, brake line, steam-pipe and telephone connections.

The couplers, when joined together, are held against relative angular and transverse movement by the interfitting projection and recesses on the abutments at the sides of the couplers so that the knuckles need only serve to hold the couplers against relative longitudinal movement to insure a completely rigid tightly locked connection. Since the knuckles do not have to assist in holding the parts against angular or transverse movement the parts of the coupler can be made to conform to the lines of standard M. C. B. or A. R. A. Janney couplers, leaving ample clearance for the knuckles to swing into and out of coupling engagement, as shown in the drawings. The abutment face at one side of the center of each coupler is set back of the coupling plane of the knuckles to provide clearance for the swinging movement of the guard arm of a standard Janney coupler and to permit relative vertical movement thereof without interference by the abutment as shown in Figure 4.

As shown in the drawing, the contact faces of the abutments 21 and 22 are positioned sufficiently far forwardly relative to the transverse plane passing through the traction or contact surfaces of the knuckles when in coupled relation, that when the abutment surfaces are in contact with corresponding surfaces of a co-operating coupler there is still room for the knuckles to swing to exert a drawing action on the couplers. The knuckles, as shown at the right in Fig. 7, for instance, are limited in their locking movement by their tail-pieces so that the knuckle cannot be swung inwardly a sufficient amount to prevent the entrance of a co-operating coupler to engaging position. The extra amount of projection of the abutment faces is to insure tight engagement even after either the contact faces of the knuckles or the abutment faces of the couplers have been worn, as may occur when a coupler is used with some other form of coupler that will permit relative movement and consequent wear.

I claim:—

1. In combination, a pair of Janney couplers having abutting faces, and locking means for holding said faces in close contact and preventing relative longitudinal movement of said couplers, said locking means being movable to different locking positions to compensate for wear and to hold said faces together after the parts of said couplers have become worn.

2. In combination, a pair of Janney type couplers having contact faces, means for holding said couplers against relative transverse displacement, and locking means for holding said couplers against relative longitudinal movement, said first named means comprising a projection on each coupler arranged to fit into a recess on the co-operating coupler the walls of which recess hold said projection against transverse movement in all directions independently of said locking means.

3. In combination, a pair of Janney type couplers having abutting faces, and locking means for said couplers arranged to exert a continuous force tending to draw said faces together, said locking means having clearance for additional movement beyond that necessary for bringing said faces into contact.

4. In combination, a pair of Janney type couplers having coupling knuckles, and means for locking said knuckles against uncoupling movement, said locking means being arranged to exert a continuous force on said knuckles tending to rotate said knuckles in a direction to draw said couplers together, said locking means and knuckles having clearance for additional movement beyond that necessary to bring said couples into contact.

5. In combination, a pair of coupling heads of the Janney type, each head being pivotally secured to a car body, hinged knuckles on each head to hold the heads in coupled relation, means on each head operating independently of said knuckles and cooperating with other means on the coupled head to prevent vertical, lateral or bending movement of the heads in all directions relative to each other, and means co-operating with said hinged knuckles to prevent relative longitudinal movement of said heads.

6. In combination, a pair of Janney type couplers having complementary projections and recesses on their adjacent faces operable to aline and maintain said coupler heads in horizontal and vertical alinement, said couplers having holding knuckles, and locking members co-operating with said holding knuckles to draw the adjacent faces of said couplers together and maintain a longitudinally tight connection between said couplers, said knuckles and locking members having clearance to permit movement beyond that necessary to produce tight connection between said couplers.

7. In combination, a pair of Janney type car couplers for securing together adjacent cars in a train, said couplers having pivotal connection with their respective cars, means for holding said couplers in rigid alinement against relative vertical and lateral displacement in all directions and against bending movement, and locking means for holding said couplers against longitudinal displacement, the means for holding said couplers in alignment being arranged to operate independently of said locking means while said locking means is arranged to exert a continuous force tending to take up lost motion between said couplers.

8. In combination, a pair of Janney type couplers having abutment members projecting at the sides thereof to provide abutment faces for said couplers, complementary projections and recesses on said abutment faces for holding said couplers in longitudinal alinement, said couplers having coupling knuckles, and means co-operating with said knuckles to constantly draw said abutment faces into close contact with each other, said knuckles and co-operating means having clearance to permit movement beyond that necessary to draw said faces into contact.

9. In combination, a pair of Janney type couplers having engaging abutment faces and coupling knuckles thereon, and wedging means for holding said knuckles in coupled relation, said wedging means being arranged to exert a continuous wedging action on said knuckles when in coupled relation while said knuckles and wedging means are provided with clearance to permit movement thereof beyond that necessary to bring said abutment faces together.

10. In combination, a pair of Janney type couplers having coupling knuckles thereon, means operating separately from the knuckles for holding said couplers against lateral, vertical and angular displacement, wedging means for holding said knuckles in coupled relation, and springs for exerting pressure on said wedging means to cause said knuckles to draw said couplers toward each other, said knuckles and the wedging means having clearance to permit movement thereof beyond that necessary to bring said couplers into contact.

11. In combination, a pair of Janney type couplers pivotally connected to cars to be coupled together, said couplers having coupling knuckles, means co-operating with said coupling knuckles to draw said couplers into tight contact and hold said couplers against relative longitudinal movement, and train line connectors fixed to said couplers, said knuckles and co-operating means having a greater range of movement than that necessary to bring said couplers into contact, to compensate for wear.

12. In combination, a draw-bar having pivotal connection with a car to be coupled, a Janney type coupling knuckle mounted on said draw-bar at the coupled end thereof, a constantly acting wedging member for holding said knuckle in coupled position, said knuckle having clearance for movement beyond its coupling position, and a train line connection fixedly mounted at the coupling end of said draw-bar.

13. Coupling mechanism for cars comprising draw-bars arranged to be pivotally connected to cars to be coupled, Janney type coupling knuckles mounted on the coupling ends of said draw-bars, means for guiding said draw-bars into alinement on impact of the cars and for holding said draw-bars against vertical, lateral and bending displacement, continuously acting wedging means co-operating with said knuckles to hold the contact faces of said draw-bars against longitudinal displacement, and train line connection members carried by said draw-bars in fixed relation thereto and in position to register with each other when said draw-bars are coupled by said coupling knuckles.

14. In combination, a Janney type coupler having abutments thereon, and locking means adapted to draw said abutments tightly against abutments of a co-operating coupler preventing relative longitudinal movement of said couplers, said locking means having a range of movement greater than is required to bring said abutments together.

15. In combination, a pair of couplers vertically yielding and laterally movable means for supporting said couplers on cars to be coupled, means for alining said couplers on impact of said cars and for retaining said couplers in alignment independently of said knuckles, locking knuckles for holding said couplers in coupled relation, and means co-operating with said locking knuckles to hold said couplers tightly together against relative longitudinal movement, said holding means having a range of movement beyond that necessary to bring said couplers together.

16. In combination, a pair of couplers having projections thereon providing contact faces, co-operating projections and recesses on said faces having tapered portions for guiding said couplers into alinement on impact thereof and having straight contact faces for holding said couplers against relative lateral displacement in all directions, pivoted knuckles for holding said couplers in coupled relation, and means arranged to act continuously on said knuckles when in coupled relation to take up play between said contacting faces, said knuckles and last named means having clearance to prevent interference with the force exerted thereby when said contacting faces are in engagement.

17. In combination, a pair of co-operating couplers, yielding means tending to resist buckling of said couplers when brought together at an angle on impact of the couplers, means for guiding said couplers into alinement on impact thereof and for holding said couplers in alignment against relative lateral movement in either direction, pivoted knuckles for holding said couplers in coupled relation, and wedging means arranged to exert continuously acting forces on said knuckles to take up play between said couplers and hold said couplers against relative longitudinal movement.

18. The combination with couplers of the Janney type, of yielding means tending to resist buckling of said couplers when brought together at an angle on impact of the couplers, means for guiding said couplers into alinement, and means for holding said couplers against relative longitudinal movement when said couplers are joined together, said holding means being arranged to draw said couplers together and having a range of movement to hold said couplers together after the parts have been worn.

19. In combination, a pair of co-operating couplers of the Janney type, yielding means for holding said couplers in contact position on their respective cars, abutments on said couplers projecting therefrom and providing contact faces, said abutments having complementary projections and recesses thereon for guiding said couplers into longitudinal alinement upon impact thereof, holding knuckles pivotally mounted on said couplers in position to hold said couplers together, tail-pieces on said holding knuckles, wedging members for engaging said tail-pieces to exert continuously acting wedging forces on said tail-pieces tending to draw said knuckles together, and springs for pressing said wedging members against said tail-pieces.

20. In combination, a Janney coupler having a coupling knuckle thereon provided with a tail-piece, and a spring lock for engaging said tail-piece when said knuckle is in open position to hold said knuckle in open position, said lock having a wedging surface thereon arranged to engage said tail-piece when said knuckle is in a different position to exert a wedging force on said knuckle to urge said knuckle into closed position.

21. In combination, a coupler of the Janney type having a coupling knuckle pivoted thereon provided with a tail-piece, a spring for engaging said tail-piece to move said coupler toward open position, and a spring lock for holding said coupler in open position, said spring lock having a wedging face thereon arranged to engage said tail-piece to exert wedging force on said knuckle to move said knuckle into closed position.

22. In combination, a pair of car couplers of the Janney type, means for alining said couplers on impact thereof, train line connections carried by said couplers in fixed position relative thereto, and means for holding said couplers against relative transverse, angular and longitudinal movement when coupled together, said means comprising a locking device arranged to exert a force tending to draw said couplers together and having a range of action greater than that necessary to bring said couplers into engagement.

23. In combination, a pair of couplers of the Janney type, yielding means for holding said couplers against vertical and transverse movement on their respective cars, means for alining said couplers on impact thereof, train line connections carried by said couplers in fixed relation thereto, and means for locking said couplers against relative longitudinal movement when coupled together.

24. The combination with a pair of couplers of the Janney type, of yielding means for holding said couplers against lateral and vertical movement on their respective cars, means for alining said couplers on impact of said cars and for holding said couplers against relative vertical, horizontal and bending movement, coupling knuckles on said couplers, and wedging means co-operating with said coupling knuckles to take up relative longitudinal movement of said couplers.

25. In a Janney coupler the combination of abutments on the sides of said coupler having a projection and a recess adapted to align and maintain the horizontal, vertical and longitudinal center lines of said coupler in registration with the corresponding center lines of a co-operating coupler when in coupled relation, and a pivoted knuckle adapted to couple and hold said couplers against independent longitudinal movement.

26. In combination, a pair of couplers, each comprising a drawbar universally pivoted on its car, a coupler head on said drawbar, and means for yieldingly supporting said drawbars for vertical and lateral movement relative to their cars, each coupler head having a Janney type knuckle with abutments at the sides of said knuckle provided with pins and holes for holding said coupler heads against relative vertical and lateral displacement when coupled, said knuckles when coupled serving to lock said coupler heads together against relative longitudinal movement while said pins and holes prevent all other relative movement of said drawbar so that said drawbars form a rigid bar between the pivotal supports on said cars.

27. In combination, a pair of Janney type couplers, and horizontally movable wedging means for holding the knuckles on said couplers in coupled relation, said knuckles and wedging means having a range of movement beyond that necessary for tightly locking said couplers against relative longitudinal movement.

28. In a pair of Janney type couplers, the combination of coupler heads in which the co-operating knuckles are arranged to connect said coupler heads and hold said heads against independent longitudinal movement, means on said heads comprising abutments having pins and holes, the pins being made to fit closely within the holes for the purpose of alining and maintaining in alinement the vertical, longitudinal and horizontal center lines of said coupler heads.

29. In a pair of Janney type couplers, the combination of coupler heads, the co-operating knuckles of which have tail-pieces, and locking means co-operating with said tail-piece to draw said knuckles together and hold said coupler heads against relative longitudinal movement, said heads having pins and holes provided with straight faces, the pins being made to fit closely in the holes of the complementary heads to aline said couplers and maintain said couplers against transverse and angular movement relative to each other.

30. In a pair of Janney type couplers, the combination of coupler heads having co-operating abutments thereon, the co-operating swinging knuckles of said heads having tail-pieces thereon, locking means co-operating with said tail-pieces to draw said coupler heads tightly together against said abutments and hold said heads against independent longitudinal movement, said abutments having pins and holes on the faces thereof adapted to aline the vertical, longitudinal and horizontal center lines of said couplers prior to engagement of said abutments on impact of said couplers.

31. In combination, a pair of Janney type coupler heads, said coupler heads having abutments at the sides thereof with projections and recesses thereon to hold said heads rigidly in alinement, locking means for drawing the pivoted knuckles of said heads into engagement to hold said heads against relative longitudinal movement, and universal pivotal connections for securing said heads to their respective cars.

32. In combination, a pair of Janney type coupler heads, said coupler heads having abutments at the sides thereof with projections and recesses thereon to hold said heads rigidly in alinement, locking means for drawing the pivoted knuckles of said heads into engagement to hold said heads against relative longitudinal movement, universal pivotal connections for securing said heads to their respective cars, and vertically yielding means for supporting said heads.

33. In combination, a pair of Janney type coupler heads, said coupler heads having abutments at the sides thereof with projections and recesses thereon to hold said heads rigidly in alinement, locking means for drawing the pivoted knuckles of said heads into engagement to hold said heads against relative longitudinal movement, universal pivotal connections for securing said heads to their respective cars, vertically yielding means for supporting said heads, and laterally yielding means for resisting movement of said heads laterally from central alinement.

34. In combination, a pair of couplers of the Janney type having engaging abutment faces, said faces being so positioned relative to the contacting surfaces of the coupler knuckles that said faces will engage each other during coupling before said knuckles reach the limit of their movement so that said knuckles may continue to exert a drawing action on said couplers after said abutment faces are in contact.

35. In combination, a pair of couplers of the Janney type having abutment faces positioned forwardly relative to the contact plane of the coupler knuckles a sufficient amount to bring said faces into engagement before the knuckles have both reached the limit of their coupling movement, and wedging means for actuating said knuckles to exert a drawing action on said couplers after said abutment surfaces are in contact.

36. In combination, a pair of Janney type couplers secured to adjacent ends of cars to be coupled together, said couplers having interfitting pins and holes to hold said couplers against relative transverse movement, means co-operating with the coupling knuckles of said couplers to draw said couplers into tight contact and hold said couplers against relative longitudinal movement, and train line connections fixed to said couplers, said knuckles and co-operating means having a greater range of movement than that necessary to bring said couplers into contact to compensate for wear.

37. In combination, a pair of Janney type couplers having contacting abutments thereon provided with engaging pins and holes to prevent relative transverse movement of said couplers, wedging locking means for the knuckles of said couplers, train line connections fixed to said couplers and alined and maintained in alinement by said pins and holes and held together by said knuckles and wedging locking means.

38. In combination, a pair of Janney type couplers having contacting abutments thereon provided with engaging pins and holes to prevent relative tranverse movement of said couplers, wedging locking means for the knuckles of said couplers, air, steam and electrical connections fixed to said couplers and alined and maintained in alinement by said pins and holes and held together by said knuckles and wedging locking means.

In testimony whereof I have signed my name to this specification on this 5th day of June, A. D. 1926.

CHARLES H. TOMLINSON.